No. 725,014. PATENTED APR. 7, 1903.
J. G. WESTOVER.
VEHICLE WHEEL.
APPLICATION FILED NOV. 7, 1902.
NO MODEL.
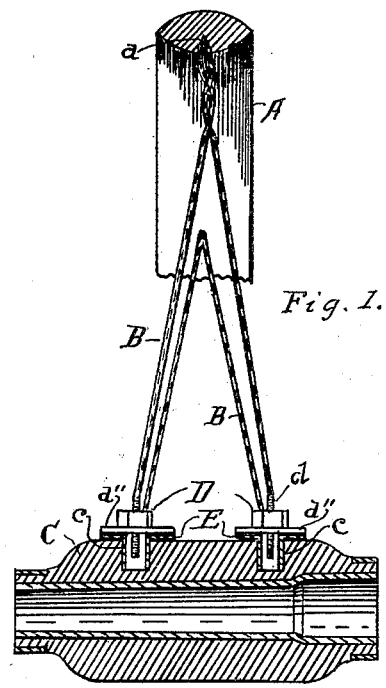
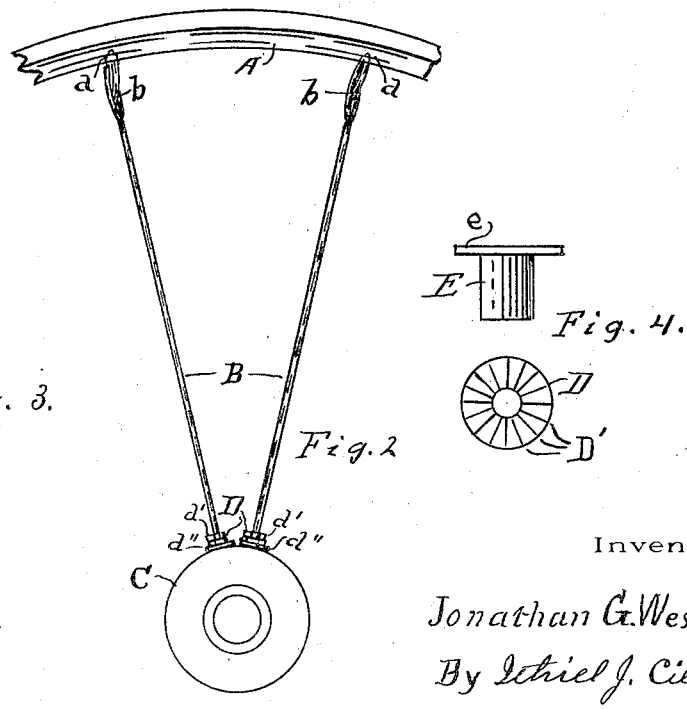
Witnesses
Inventor.
Jonathan G. Westover
By Ithiel J. Cilley
Attorney.

UNITED STATES PATENT OFFICE.

JONATHAN G. WESTOVER, OF NUNICA, MICHIGAN.

VEHICLE-WHEEL.

SPECIFICATION forming part of Letters Patent No. 725,014, dated April 7, 1903.

Application filed November 7, 1902. Serial No. 130,471. (No model.)

*To all whom it may concern:*

Be it known that I, JONATHAN G. WESTOVER, a citizen of the United States, residing at Nunica, in the county of Ottawa and State of Michigan, have invented certain new and useful Improvements in Vehicle-Wheels, of which the following is a specification.

My invention relates to improvements in carriages, wagons, &c.; and its objects are, first, to provide a wheel that may be manufactured and shipped in the knockdown and readily and conveniently assembled when desired; second, to provide a wheel with which the length of the spokes between the hub and the rim may be varied at pleasure, and, third, to provide against the danger of the openings or receptacles in the hub for the ends of the spokes being enlarged by the chafing of the ends of the spokes. I attain these objects by the mechanism illustrated in the accompanying drawings, in which—

Figure 1 is a cross-section of a portion of a wheel, showing the form of the spoke and the manner of applying the same. Fig. 2 is a side elevation of the same. Fig. 3 is a perspective of the bushing for the receptacles in the hubs, showing an upwardly-projecting rim for receiving the flange of the nuts; and Fig. 4 is an elevation of the same and a bottom plan of the nut.

Similar letters refer to similar parts throughout the several views.

A represents the rim of the wheel, which I make of steel, preferably lenticular in cross-section. I make a series of indentures or countersunk receptacles $a$ in the inner surface of the rim for the reception of the ends of the spokes B of sufficient depth to insure the retention of the spokes to place, but not of sufficient depth to interfere with readily and easily removing or replacing the spokes when desired.

The spokes B are of metal and bifurcated, as shown in Fig. 1, and I prefer that the upper end be twisted, as at $b$, for a short distance from the rim, as by this means I am able to impart to the spokes a slight elasticity, which I find very desirable and which cannot be otherwise produced to as good advantage. The lower ends of the spokes are provided with a screw-thread, as at $d$, designed to engage the nuts D for the purpose of lengthening or shortening the spokes, as may be desired, when assembling or adjusting the wheel. These ends after passing through the nuts pass into apertures $c$ in the hubs C, which I protect from being worn by the action of the ends of the spokes by inserting a metal thimble E. This thimble may be formed with a plain flange $e$ to act as a bearing for the nut to bear upon, or it may be provided with an upwardly-projecting flange $e'$ of a proper diameter to receive the flange on the nut and avert the danger of the threaded portion of the ends of the spokes from coming in contact with the metal thimble and wearing off or marring the threads.

The hub is designed to be made of wood, as much less expensive and more available than metal; hence the necessity of the metal thimble heretofore described.

The nuts may be locked to place by means of jam-nuts, as indicated at $d'$ in Fig. 2, in the usual manner. At $d''$ I show the flange of the nut, which is much broader than the surface of the nut to form a broad stable bearing upon the flange $e$ of the thimble, as hereinbefore more fully set forth; but I prefer the construction shown in Figs. 3 and 4, in which the thimble is shown as overlapping at one side and the nut is shown as provided with teeth or serrations $D'$, so arranged that the nut will screw to place smoothly, but in unscrewing the teeth will engage the surface of the thimble-flange, so that it cannot be turned back without a considerable effort, which effort will, when the nut is turned back, cause the overlapping side of the thimble at $E'$ to be drawn around sufficiently so that the thimble may turn in its receptacle in the hub until the nut is drawn up sufficiently to clear it, when the elasticity of the thimble will cause it to expand sufficiently to hold it again firmly in the receptacle. By this means I am able to provide not only a perfect nut-lock, but also to make it sufficiently adjustable to insure the free and perfect manipulation of the nut.

Having thus fully described my invention, what I claim as new, and desire to secure by Letters Patent of the United States, is—

1. In combination with the wooden hub and metal rim of a vehicle-wheel, bifurcated spokes twisted near the top and countersunk into the rim, the lower ends provided with screw-threads and entering apertures in the hub, nuts upon said screw-threaded ends, and metal thimbles in the apertures in the hubs, substantially as and for the purpose set forth.

2. In combination with the hub and rim of a vehicle-wheel, bifurcated spokes twisted at the upper ends and entering countersinks in the rim, the lower ends screw-threaded and nuts thereon, the hub provided with apertures, and thimbles in said apertures, said thimbles having overlapping flanges, and the ends of the spokes entering said thimbles, substantially as and for the purpose set forth.

3. In combination with the hub and rim of a vehicle-wheel, bifurcated metal spokes having a screw-thread and nuts at the lower ends, the hub provided with apertures for the reception of the ends of the spokes, metal thimbles in said apertures, said thimbles having overlapping flanges and upwardly-projecting rims, substantially as and for the purpose set forth.

4. In combination with the hub and metal spokes of a vehicle-wheel, a thimble in the hub, said thimble open and overlapping at one side, and a nut serrated on its under surface, substantially as and for the purpose set forth.

Signed at Nunica, Michigan, November 3, 1902.

JONATHAN G. WESTOVER.

In presence of—
CHARLES E. JUBB,
APOLAS GRISWOLD.